United States Patent [19]
Karube

[11] Patent Number: 4,907,241
[45] Date of Patent: Mar. 6, 1990

[54] GAS LASER DEVICE

[75] Inventor: Norio Karube, Machida, Japan

[73] Assignee: Fanuc Ltd, Yamanashi, Japan

[21] Appl. No.: 174,999

[22] PCT Filed: Jul. 15, 1987

[86] PCT No.: PCT/JP87/00511
§ 371 Date: Mar. 2, 1988
§ 102(e) Date: Mar. 2, 1988

[87] PCT Pub. No.: WO88/00764
PCT Pub. Date: Jan. 28, 1988

[30] Foreign Application Priority Data
Jul. 18, 1986 [JP] Japan ................... 61-169546

[51] Int. Cl.$^4$ ........................... H01S 3/097
[52] U.S. Cl. .......................... 372/83; 372/87; 372/93
[58] Field of Search ............. 372/83, 61, 93, 87, 372/75

[56] References Cited

U.S. PATENT DOCUMENTS

| | | | |
|---|---|---|---|
| 3,777,279 | 12/1973 | Eckbreth et al. | 331/94.5 |
| 4,288,756 | 9/1981 | Kaye | 372/83 |
| 4,596,018 | 6/1986 | Gruber et al. | 372/83 |
| 4,757,511 | 7/1988 | Klingel et al. | 372/83 |

FOREIGN PATENT DOCUMENTS

| | | | |
|---|---|---|---|
| 3403841 | 8/1985 | Fed. Rep. of Germany | 372/87 |
| 39-16043 | 8/1964 | Japan . | |
| 49-9993 | 1/1974 | Japan . | |
| 0039393 | 3/1977 | Japan | 372/93 |
| 0118379 | 9/1981 | Japan | 372/61 |
| 57-9236 | 2/1982 | Japan . | |
| 58-157186 | 9/1983 | Japan . | |
| 58-158985 | 9/1983 | Japan . | |
| 0075576 | 4/1986 | Japan | 372/93 |
| 0274378 | 12/1986 | Japan | 372/61 |

Primary Examiner—Frank Gonzalez
Attorney, Agent, or Firm—Staas & Halsey

[57] ABSTRACT

A gas laser device in which a laser medium gas is circulated in a discharge tube and a laser beam is generated from the gas excited by a high-frequency electric discharge, includes a high-frequency power supply (3) serving as an electric discharge power supply and a plurality of reflecting mirrors (6, 7) disposed axially in the discharge tube (1). The distance (d) between electrodes of the discharge tube (1) is selected such that electrons will not collide with side walls of the discharge tube based on the frequency (f) of the high-frequency power supply (1) and electron mobility. The oscillation efficiency of the laser beam is increased because of electron capture and since the distance traversed by the laser beam (9) in the discharge tube (1) is increased.

7 Claims, 1 Drawing Sheet

GAS LASER DEVICE

BACKGROUND OF THE INVENTION

1. Field of the Invention

The present invention relates generally to a gas laser device, and more particularly, to a gas laser device including a discharge tube shaped for increased oscillation efficiency.

2. Description of the Related Art

Increasing the oscillation efficiency in gas laser devices is an important technical target. Techniques for achieving this target include the generation of positive discharge resistance characteristics due to electron capture in a high-frequency electric discharge, and the removal of a cathode effect. The electron capture technique requires increasing the frequency of an electric discharge power supply.

It is highly difficult to provide a high-output, high-frequency power supply. In order to achieve electron capture, i.e., to prevent electrons from reaching side walls of a discharge tube, it is necessary that the distance d between electrodes in the discharge tube be considerably greater than the distance l that electrons move per half of the frequency, as indicated by the following equation:

$$l = 2\mu E/\omega = Ve/\pi f << d$$

where
- l—the distance which electrons move,
- $\mu$—electron mobility,
- E—electric field intensity,
- $\omega$—angular velocity of the power supply,
- f—frequency of the power supply,
- Ve—speed of electrons, about $8 \times 10^6$ cm/sec, and
- d—distance between side walls of the discharge tube.

Assuming that d=2 cm and the minimum distance for the electrons not to collide with the side walls is l=d, f is calculated as follows:

$$f = 1.24 \text{ MHz}.$$

Therefore, a considerably high frequency is required.

Vacuum tubes may be employed in a high-frequency power supply. However, since the service life of vacuum tubes is only about 3,000 hours, it would be problematic to construct a practical gas laser device employing such a high-frequency power supply. Therefore, solid-state devices such as semiconductors or the like should desirably be employed to construct a high-frequency power supply. In a large-output range, however, the output frequency of a currently available high-frequency power supply constructed of solid-state devices is about 2 MHz. Thus, the above requirement cannot be satisfactorily met. Specifically, assuming that the frequency of a high-frequency power supply is 2 MHz, then $$l/d = 0.62.$$

SUMMARY OF THE INVENTION

It is an object of the present invention to provide a gas laser device which will solve the above problems and has a discharge tube shaped for increased oscillation efficiency without substantially increasing the frequency of a power supply.

To solve the above problems, there is provided in accordance with the present invention a gas laser device in which a laser medium gas is circulated in a discharge tube and a laser beam is generated from the gas excited by a high-frequency electric discharge. The device includes a high-frequency power supply serving as an electric discharge power supply. The distance between electrodes of the discharge tube is selected such that electrons will not collide with side walls of the discharge tube based on the frequency of said high-frequency power supply and electron mobility. A plurality of reflecting mirrors reflect the laser beam along a folded path and amplifying the laser beam.

Since the distance between the electrodes is increased by folding the path of the laser beam, the distance that can be traversed by electrons at a constant frequency is increased, thus bringing about electron capture. Moreover, inasmuch as the distance which the laser beam moves axially in the discharge tube is increased, the degree of amplification correspondingly increases.

DETAILED DESCRIPTION OF THE PREFERRED EMBODIMENTS

An embodiment of the present invention will hereinafter be described in specific detail with reference to the drawings.

Figure 1:
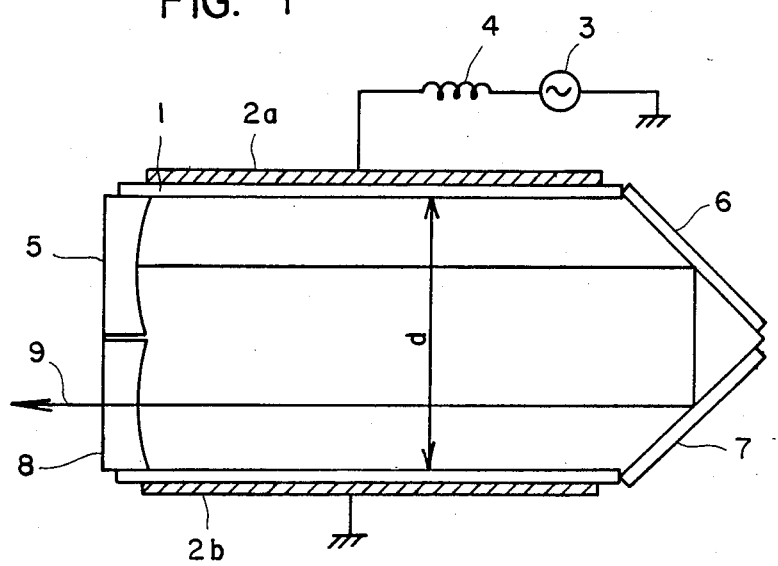
FIG. 1 is a cross-sectional view of preferred embodiment of the present invention.
Figure 2:
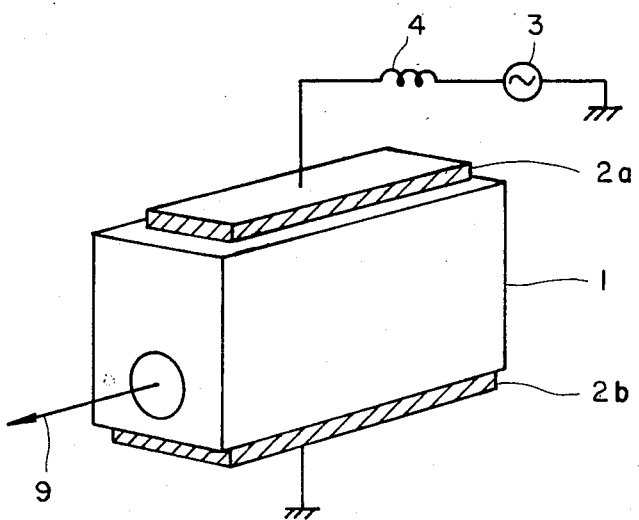
FIG. 2 is a schematic view of the device shown in FIG. 1.

Referring to FIGS. 1 and 2, a gas laser device includes an electric discharge tube 1 in which a laser medium gas is circulated and an electric discharge is produced to excite the laser medium gas for amplifying a laser beam, and electrodes 2a and 2b. Electrode 2a is connected to a high-frequency power supply 3 and the electrode 2b is connected to ground. The high-frequency power supply, 3 which generates a high frequency electric discharge, is connected to the electrode 2a through a matching reactor 4. The high-frequency power supply 3 includes semiconductor devices such as FETs or the like. Since no vacuum tubes are employed in the high-frequency power supply 3, it is not necessary to replace vacuum tubes, and maintenance procedures are simplified. The high-frequency power supply 3 has an output frequency of about 2 MHz. Reflecting mirrors 5, 6 and 7 reflect the laser beam. An output mirror 8 passes and outputs a portion of the laser beam, and reflects the remainder of the laser beam. The reference numeral 9 represents an optical axis of the laser beam. In conventional discharge tubes with no folded laser beam path, the value of d is about 2 cm. With the folded laser beam path structure as shown, however, the distance between the electrodes is doubled to about 4 cm. As a result, assuming that the output frequency of the high-frequency power supply 3 is 2 MHz, $$l/d = 0.31,$$

and the high-frequency power supply 3 employing semiconductor devices can sufficiently achieve electron capture. More specifically, the distance d between the electrodes of the discharge tube can be selected to be sufficiently large so that electrons will not collide with the side walls of the discharge tube 1, at the frequency f of the high-frequency power supply 3, thus resulting in electron capture.

By reflecting the laser beam 9 along the folded path, the distance traversed by the laser beam 9 in the discharge tube 1 is twice that in the conventional structure, and hence, the degree of amplification is increased by the same proportion.

FIG. 2 schematically shows the structure of FIG. 1. Identical parts are denoted by identical reference numerals. As shown in FIG. 2, the discharge tube 1 is of a rectangular configuration. The discharge tube 1 is made of a ceramic material or the like. The electrodes 2a and 2b are made of metal and are connected to the discharge tube 1.

While the discharge tube 1 is rectangular in shape in the above embodiment, it may be of another shape, such as an elliptical shape. The number of folds of the laser beam path is shown in FIG. 1 as being 2, but may be increased by increasing the number of reflecting mirrors used, according to the value of the distance d between the electrodes.

With the present invention, as described above, since the number of reflecting mirrors as increased according to the distance between the electrodes for reflecting the laser beam along the folded path to amplify the laser beam, electron capture is caused at the frequency of the high-frequency power supply generated by semiconductor devices. The oscillation efficiency of the laser beam is increased because the distance traversed by the laser beam in the discharge tube is increased.

I claim:

1. A gas laser device in which a laser medium gas is circulated inside a discharge tube having outer surfaces and two opposite ends and a laser beam is generated from the gas excited by a high-frequency electric discharge, comprising:
   two electrodes connected to the outer surfaces of the discharge tube;
   a high-frequency power supply, electrically coupled to one of the first and second electrodes, the other of the first and second electrodes being grounded, for producing an electric discharge between the two electrodes;
   the two electrodes of said discharge tube being spaced apart by a distance defined by the equation $$l = 2\mu E/\omega = Ve/\pi f < d,$$

where
   d = distance between electrodes
   l = distance electrons move per half frequency of the power output
   $\mu$ = electron mobility
   E = electric field intensity
   $\omega$ = angular velocity of the power supply
   f = frequency of the power supply, and
   Ve = speed of the electrons
   a plurality of reflecting mirrors disposed at opposite ends of the discharge tube for reflecting the laser beam along a folded path having a plurality of folds and amplifying the laser beam; and
   wherein said high-frequency power supply comprises a semiconductor device.

2. A gas laser device according to claim 1, wherein said discharge tube is rectangular in shape.

3. A gas laser device according to claim 1, wherein the number of folds of the folded path is two.

4. A gas laser device comprising:
   a discharge tube having two opposite outer surfaces and two opposite ends;
   first and second electrodes, each being connected to one of the two opposite outer surfaces of the discharge tube;
   a high-frequency power supply electrically coupled to one of the first and second electrodes, the other of the first and second electrodes being grounded, for producing an electric discharge;
   the two electrodes being sufficiently spaced apart by a distance $$l = 2\mu E/\omega = Ve/\pi f < d,$$

where
   d = distance between electrodes
   l = distance electrons move per half frequency of the power output
   $\mu$ = electron mobility
   E = electric field intensity
   W = angular velocity of the power supply
   F = frequency of the power supply, and
   Ve = speed of the electrons
   reflecting means, disposed at the opposite ends of discharge tube, for reflecting a laser beam along a folded path having a plurality of folds and amplifying the laser beam; and
   wherein said high-frequency power supply comprises a semiconductor device.

5. A gas laser device according to claim 4, wherein the reflecting means comprises a plurality of mirrors.

6. A gas laser device according to claim 5, wherein the plurality of mirrors includes two adjacent angled reflecting mirrors.

7. A gas laser device according to claim 4, wherein the frequency of the high-frequency power supply is about two MHz and the distance between the two electrodes is about 4 cm.

* * * * *